US008891870B2

(12) United States Patent
Sebastian et al.

(10) Patent No.: US 8,891,870 B2
(45) Date of Patent: Nov. 18, 2014

(54) SUBSTANCE SUBTRACTION IN A SCENE BASED ON HYPERSPECTRAL CHARACTERISTICS

(71) Applicant: GE Aviation Systems LLC, Grand Rapids, MI (US)

(72) Inventors: Thomas Baby Sebastian, Chatham, NJ (US); Eric Daniel Buehler, Grand Rapids, MI (US); Benjamin Thomas Occhipinti, Grand Rapids, MI (US); Konrad Robert Kuczynski, Grand Rapids, MI (US); Richard Shawn Kelly, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 141 days.

(21) Appl. No.: 13/673,054

(22) Filed: Nov. 9, 2012

(65) Prior Publication Data
US 2014/0133754 A1    May 15, 2014

(51) Int. Cl.
G06K 9/34    (2006.01)
G06K 9/00    (2006.01)

(52) U.S. Cl.
CPC .............. G06K 9/344 (2013.01); G06K 9/0063 (2013.01)
USPC ....................................................... 382/173

(58) Field of Classification Search
None
See application file for complete search history.

(56) References Cited

U.S. PATENT DOCUMENTS

| 5,684,898 | A | * | 11/1997 | Brady et al. | 382/282 |
| 5,706,367 | A | * | 1/1998 | Kondo | 382/236 |
| 5,729,471 | A | * | 3/1998 | Jain et al. | 725/131 |
| 6,167,167 | A | * | 12/2000 | Matsugu et al. | 382/283 |
| 6,275,617 | B1 | * | 8/2001 | Kondo | 382/236 |
| 6,445,409 | B1 | * | 9/2002 | Ito et al. | 348/155 |
| 6,665,438 | B1 | | 12/2003 | Lin | |
| 6,728,400 | B1 | * | 4/2004 | Matsugu | 382/164 |
| 7,224,735 | B2 | * | 5/2007 | Porikli et al. | 375/240.25 |
| 7,596,240 | B2 | * | 9/2009 | Ito et al. | 382/103 |
| 7,957,592 | B2 | * | 6/2011 | Huang et al. | 382/173 |
| 2004/0264806 | A1 | * | 12/2004 | Herley | 382/284 |
| 2007/0097268 | A1 | * | 5/2007 | Relan et al. | 348/584 |
| 2007/0279629 | A1 | * | 12/2007 | Grun et al. | 356/318 |
| 2008/0056568 | A1 | * | 3/2008 | Porikli et al. | 382/173 |
| 2008/0137082 | A1 | * | 6/2008 | Grun et al. | 356/318 |

(Continued)

OTHER PUBLICATIONS

Dimitris Manolakis, David Marden, and Gary A. Shaw; Hyperspectral Image Processing for Automatic Target Detection Applications; Lincoln Laboratory Journal; pp. 79-116; vol. 14, No. 1, 2003.

Primary Examiner — Brian P Werner
Assistant Examiner — Feng Niu
(74) Attorney, Agent, or Firm — McGarry Bair PC

(57) ABSTRACT

A method of removing a hyperspectral signature from at least one hyperspectral image, includes among other things, selecting a hyperspectral signature and determining a dissimilarity value between each pixel in the at least one hyperspectral image and the selected at least one hyperspectral signature. If the dissimilarity value between the signature of a given pixel in the at least one hyperspectral image and the selected at least one hyperspectral signature is less than a predetermined threshold value then the value of the signature for the given pixel is set to zero to create a signature-subtracted hyperspectral image.

9 Claims, 7 Drawing Sheets

(56) References Cited

U.S. PATENT DOCUMENTS

| | | | |
|---|---|---|---|
| 2009/0274363 A1* | 11/2009 | Dai | 382/164 |
| 2009/0323132 A1* | 12/2009 | Yano et al. | 358/466 |
| 2010/0067791 A1* | 3/2010 | Dai | 382/167 |
| 2010/0081127 A1* | 4/2010 | Maier et al. | 435/5 |
| 2010/0188505 A1* | 7/2010 | Iwanaga et al. | 348/143 |
| 2010/0225785 A1* | 9/2010 | Shimizu et al. | 348/231.99 |
| 2010/0238325 A1* | 9/2010 | Hoshino et al. | 348/239 |
| 2010/0322480 A1* | 12/2010 | Banerjee et al. | 382/103 |
| 2012/0150028 A1* | 6/2012 | Treado et al. | 600/425 |
| 2012/0183177 A1* | 7/2012 | Ku et al. | 382/103 |
| 2014/0133753 A1* | 5/2014 | Sebastian et al. | 382/173 |

* cited by examiner

SUBSTANCE SUBTRACTION IN A SCENE BASED ON HYPERSPECTRAL CHARACTERISTICS

BACKGROUND OF THE INVENTION

The environment of a remote sensing system for hyperspectral imagery (HSI) is well described in "Hyperspectral Image Processing for Automatic Target Detection Applications" by Manolakis, D., Marden, D., and Shaw G. (Lincoln Laboratory Journal; Volume 14; 2003 pp. 79-82). An imaging sensor has pixels that record a measurement of hyperspectral energy. An HSI device will record the energy in an array of pixels that captures spatial information by the geometry of the array and captures spectral information by making measurements in each pixel of a number of contiguous hyperspectral bands. Further processing of the spatial and spectral information depends upon a specific application of the remote sensing system.

Remotely sensed HSI has proven to be valuable for wide ranging applications including environmental and land use monitoring, military surveillance and reconnaissance. HSI provides image data that contains both spatial and spectral information. These types of information can be used for remote detection and tracking tasks. Specifically, given a set of visual sensors mounted on a platform such as an unmanned aerial vehicle (UAV) or a stationary ground station, a video of HSI may be acquired and a set of algorithms may be applied to the spectral video to detect and track objects from frame to frame.

BRIEF DESCRIPTION OF THE INVENTION

One aspect of the invention is a method of removing a hyperspectral signature from at least one hyperspectral image. The method comprises selecting a hyperspectral signature; determining a dissimilarity value between each pixel in the at least one hyperspectral image and the selected at least one hyperspectral signature; and if the dissimilarity value between the signature of a given pixel in the at least one hyperspectral image and the selected at least one hyperspectral signature is less than a predetermined threshold value then setting the value of the signature for the given pixel to zero to create a signature-subtracted hyperspectral image.

DESCRIPTION OF EMBODIMENTS OF THE INVENTION

Figure 1:
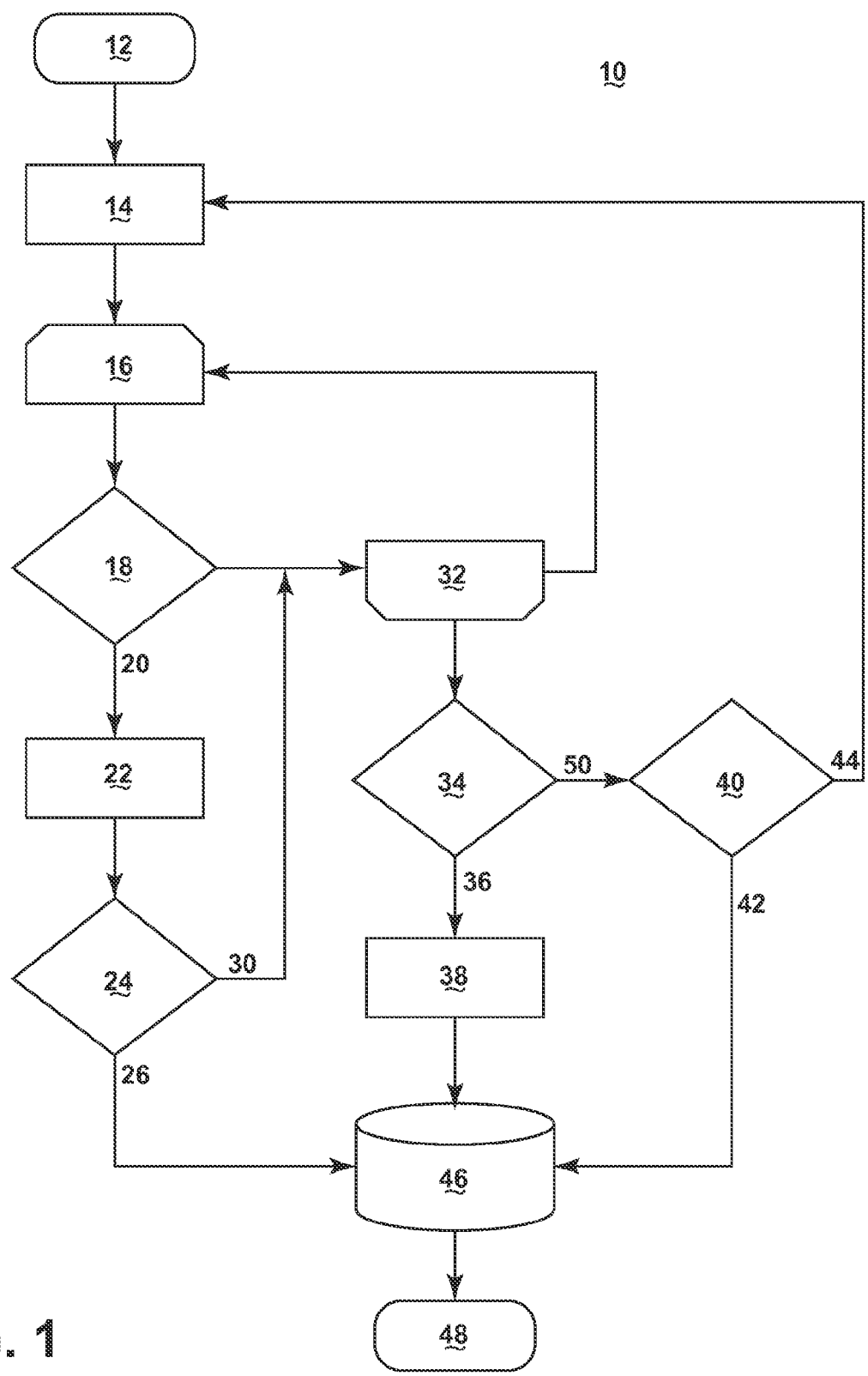
FIG. 1 is a diagrammatic view of a method of selecting hyperspectral images of scenes with no moving objects to be used for background subtraction according to an embodiment of the invention.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include increasing the compressibility of hyperspectral imagery by removing all pixels comprising unnecessary hyperspectral signatures. Consequently, the amount of data and time necessary for archival purposes is reduced. As well, the method improves on the speed of existing detection methods by substantially reducing the size of the data to be searched either manually or automatically. Additionally, the method enhances hyperspectral imagery such that previously undetected objects and features may now be detected.

FIG. 1 is a diagrammatic view of a method 10 of selecting hyperspectral images of scenes with no moving objects to be used for background subtraction according to an embodiment of the invention. At the start of the process 12, remotely sensed HSI that may include single images or a hyperspectral video feed may be input at 14 to a processor capable of processing the HSI.

The HSI input at 14 to the processor is a series of hyperspectral images of a target scene. The target scene is an imaged area where the spatial bounds of the imaged area remain constant for the entire collection of hyperspectral images such as would be collected by a stationary camera. For example, the target scene may be of a segment of highway surrounded by grassy terrain. While each hyperspectral image may be different as, for example, cars traverse the highway or the ambient light level changes throughout the day, all of the hyperspectral images in the collection should be of the same segment of highway. Note this example is for illustrative purposes only and should not be considered limiting; any series of hyperspectral images of a stationary scene may be relevant.

To determine at least one hyperspectral image having no moving objects in the target scene, the processor may start to iterate through the collected series of hyperspectral images at 16. For each collected hyperspectral image in the series, the processor may determine at 18 if the hyperspectral image has any moving or new objects in the target scene. If the processor determines that there are moving or new objects in the target scene, the processor may proceed to the next hyperspectral image in the series of hyperspectral images via the iterative logic steps at the loop terminator 32 and the loop iterator 16. If the processor determines that there are no moving or new objects in the hyperspectral image at 20, then the processor may select the hyperspectral image as a background of the target scene at 22.

The method of the current invention allows for either a hyperspectral image to represent a background of a target scene or a set of hyperspectral images to represent a background of a target scene at 24 depending upon the implementation. If the processor were to nominate a single hyperspectral image to represent the background of a target scene at 26, the processor may store a single selected hyperspectral image in a database 46 and the background selection process is terminated at 48. If the processor were to designate multiple hyperspectral images to represent a background of a target scene at 30, the processor may continue to iterate through the set of hyperspectral images via the iterative logic steps at the loop terminator 32 and the loop iterator 16.

When the processor has completely iterated through the series of hyperspectral images of a target scene at 32, the processor may determine if multiple hyperspectral images have been nominated to represent the background of a target scene. If the processor has nominated multiple hyperspectral images to represent the background of a target scene at 36, the processor may average the multiple hyperspectral images at 38 to create a single background image that is stored in the database 46 and the background selection process is terminated at 48. If the processor has not nominated multiple hyperspectral images to represent the background of a target scene at 50, then, if the processor has nominated a single hyperspectral image to represent the background of a target scene at 40, it stores the single hyperspectral image at 42 in the database 46. Then, the processor terminates the process at 48. If the processor has not nominated any hyperspectral images to represent the background of a target scene at 40, the processor at 44 may collect a new series of hyperspectral images at 14 to restart the process of selecting at least one hyperspectral image of a target scene with no moving objects.

The processor at 18 may determine if a hyperspectral image of a target scene contains moving or new targets with manual intervention by a user or automatically. According to an embodiment of the present invention, the processor at 18 may display a series of hyperspectral images to a user while in an initial state of operation. The user may select at least one hyperspectral image at 22 as a background image of the target scene. Alternatively, the processor at 18 may automatically select at least one hyperspectral image at 22 as a background image of a target scene based upon a set of criteria applied to the current hyperspectral image. The criteria may be based on spatial or spectral characteristics of the hyperspectral image and may employ comparisons of the current hyperspectral image to previously collected HSI.

Figure 2:
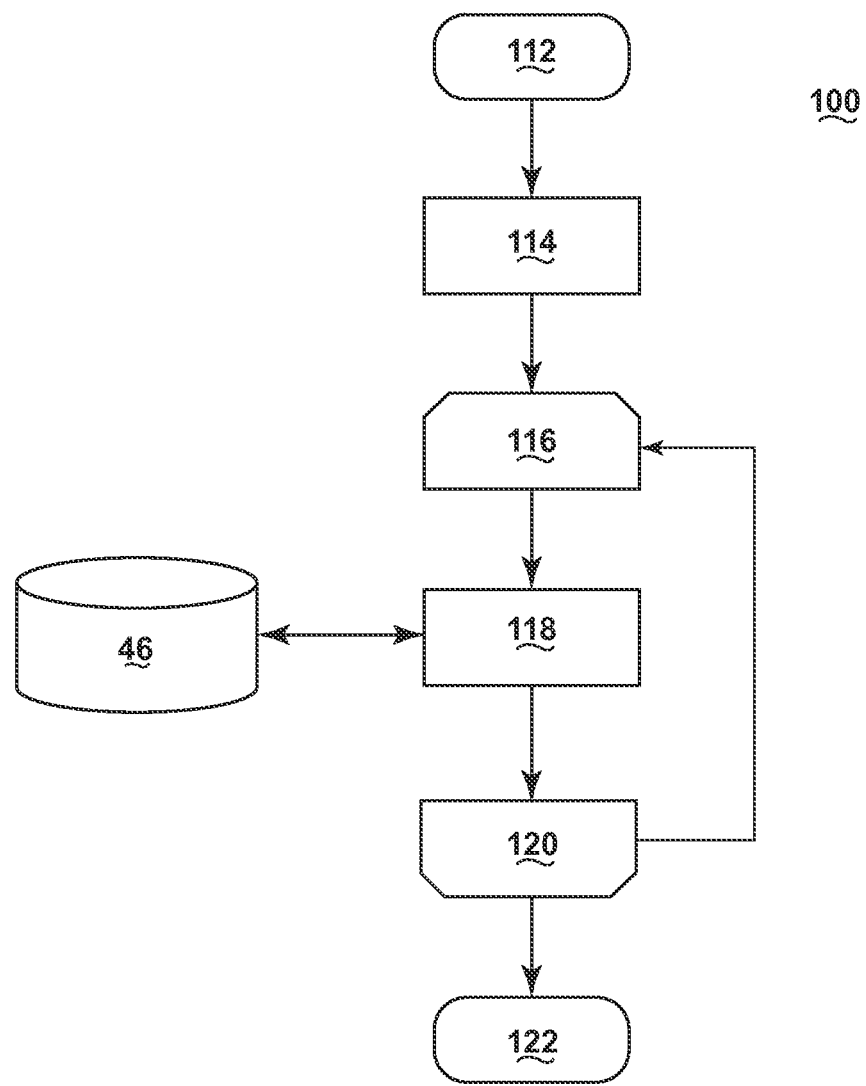
FIG. 2 is a diagrammatic view of a method of creating a background-subtracted hyperspectral image according to an embodiment of the invention.

Upon determining, selecting and storing a hyperspectral image to represent the background of a target scene with no moving or new objects, the processor may then remove the background from hyperspectral images of the target scene. FIG. 2 is a diagrammatic view of a method of creating a background-subtracted hyperspectral image 100 according to an embodiment of the invention. At the start of the process 112, remotely sensed HSI that may include single images or a hyperspectral video feed may be input at 114 to a processor capable of processing the HSI. The remotely sensed HSI may be the same series of hyperspectral images from 14 of FIG. 1 or may be a new series of hyperspectral images of the same target scene. The processor may start to iterate through the collected series of hyperspectral images at 116.

At 118, the processor may subtract the background image of the target scene stored in the database at 46 from the current hyperspectral image to create a background-subtracted hyperspectral image. While the subtraction may be a simple pixel subtraction whereby the pixel signature of the background image is subtracted from the signature of the corresponding pixel of the hyperspectral image, other methods of subtraction may be used depending upon the implementation. For example, the processor may perform the subtraction at 118 by setting the resulting pixel value to zero if the absolute difference between the signature of the background image pixel and the signature of the corresponding pixel of the hyperspectral image is less than a predetermined threshold value. For one example predetermined threshold, every value of the hyperspectral signature must be within 5% of the corresponding value of the signature of the pixel of the background image. Other thresholds may be used depending upon the implementation.

The background-subtracted hyperspectral image may then be stored in the database at 46 or displayed to a user. The processor may then loop through the series of hyperspectral images via iterative logic at 120 and 116 until terminating the process at 122.

The format of the background-subtracted hyperspectral image stored in the database at 46 represents a substantially compressed version of the original hyperspectral image. Similar to how each RGB pixel in a traditional color image contains three values, each pixel in a hyperspectral image contains N values, one for each spectral band, where N is much larger than three. By saving only the pixels of moving or new objects in the target scene, the number of pixels saved to the database 46 may be dramatically lowered while preserving the N values of all the spectral bands. For example a 640×480 pixel hyperspectral image with 20 bands would require 6,144,000 unique numerical values to completely store in database 46. If only 300 pixels are determined to be of moving or new objects in the scene, the processor would need to store 300*20=6000 numerical values and the corresponding two dimensional pixel coordinates for a total of 6,600 values in the database 46.

In one embodiment of the present invention, several different background images of a single target scene are stored and categorized in database 46 through multiple instances of the method of determining a background image 10. Each background image of the target scene in the database 46 is categorized by the illumination of the target scene. Example categories may be representative of daytime conditions such as morning, noon, sun, evening, night, partly cloudy and completely cloudy. When the processor generates a background-subtracted image at 118, the processor may determine which background image to retrieve from database 46 by characterizing the attributes of the hyperspectral image or comparing the collection times of the background images and the hyperspectral image of the scene.

Figure 3:
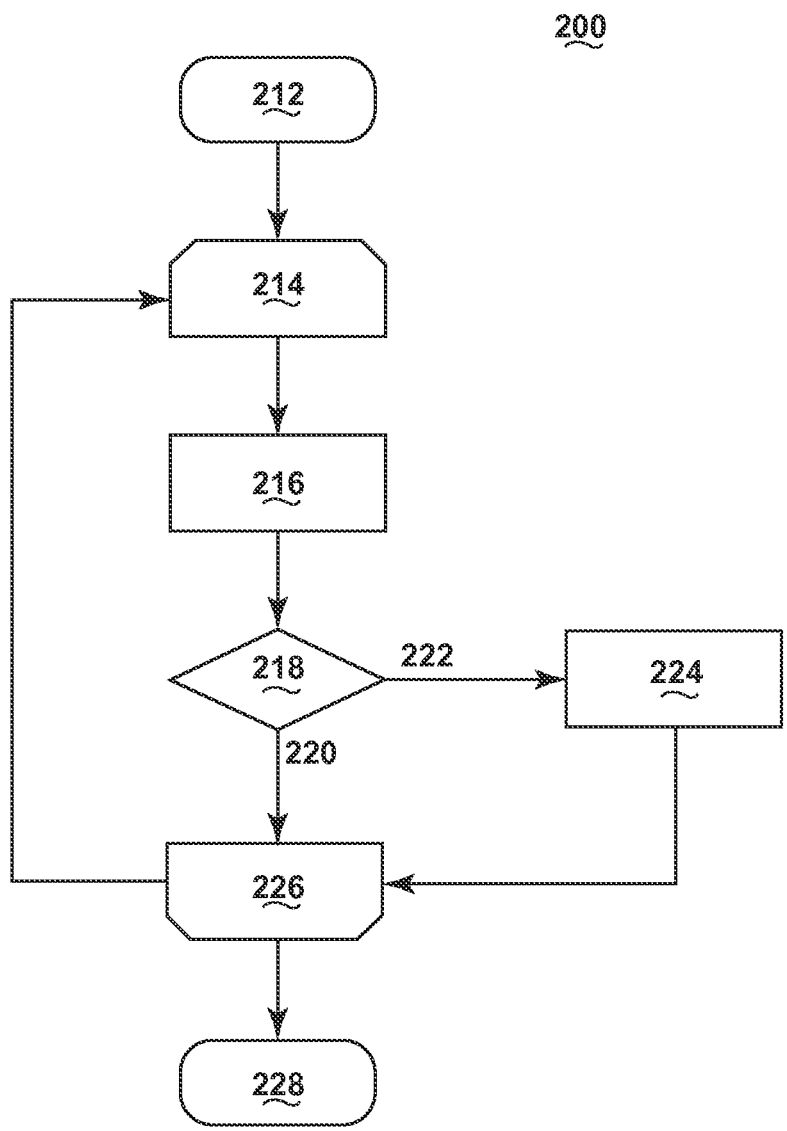
FIG. 3 is a diagrammatic view of a method of creating a signature-subtracted hyperspectral image according to an embodiment of the invention.

FIG. 3 is a diagrammatic view of a method of creating a signature-subtracted hyperspectral image 200 according to an embodiment of the invention. At the start of the process 212, a hyperspectral image and a hyperspectral signature may be input to a processor capable of processing the pixels of a hyperspectral image. The hyperspectral image may be one of the series of hyperspectral images from 14 of FIG. 1 though the source of the hyperspectral image may depend upon the implementation.

The source of the hyperspectral signature to be removed from the hyperspectral image may be a database of signatures or signatures from the hyperspectral image itself. A database of hyperspectral signatures may contain the signatures of natural or manmade substances of interest to a user of the method 200. Additionally, a user may choose to generate additional signatures for subtraction by combining known signatures of substances in the database. For example, a user may generate a signature for subtraction by combining multiple signatures each with different weightings. In another example, a user may create a signature for subtraction by selecting a set of spectral bands from a first signature and a different set of spectral bands from a second signature. In yet another example, the processor may create a set of related signatures by applying a transform to a selected signature to simulate the signature of a substance under varying lighting conditions such as sunlight, moonlight or headlights.

The processor may start to iterate through the pixels of the hyperspectral image at 214. The processor may compare the signature of the pixel of the hyperspectral image to the selected hyperspectral signature to determine a match by determining a dissimilarity measure at 216 and comparing the value of the dissimilarity measure to a predetermined threshold at 218. A dissimilarity measure is a metric for determining the mathematical distance between two vectors. For example, the processor may determine a match using the Manhattan distance or $l_1$ norm, to calculate if the sum of the absolute differences between the signature of the pixels of the hyperspectral image and the selected hyperspectral signature is less than a predetermined threshold value.

The processor may calculate other dissimilarity measures. One class of dissimilarity measures are norm-based and are direct calculations of a distance between two vectors. Besides Manhattan distance, the processor may calculate a dissimilarity measure from Euclidean distance, also known as the $l_2$ norm, to determine a match if the square root of the sum of the squared differences between the signature of the pixels of the hyperspectral image and the selected hyperspectral signature is less than a predetermined threshold value. In another example of a norm-based dissimilarity measure, the processor may calculate the Chebyshev distance, also known as the $l_\infty$ norm, to determine a match if the maximum absolute difference between the signature of the pixels of the hyperspectral image and the selected hyperspectral signature is less than a predetermined threshold value.

Another class of dissimilarity measures has been developed to exploit statistical characteristics of candidate targets in the imagery. For example, Mahalanobis distance is a statistical measure of similarity that has been applied to hyperspectral pixel signatures. Mahalanobis distance measures a signature's similarity by testing a signature against an average and standard deviation of a known class of signatures. Because of the statistical nature of the measure, calculating Mahalanobis distance requires sets of signatures instead of a single signature comparison as used for the norm-based calculations.

Other known techniques include Spectral Angle Mapper (SAM), Spectral Information Divergence (SID), Zero Mean Differential Area (ZMDA) and Bhattacharyya distance. SAM is a method for comparing a signature to a known signature by treating each spectra as vectors and calculating the angle between the vectors. Because SAM uses only the vector direction and not the vector length, the method is insensitive to variation in illumination. SID is a method for comparing a candidate target's signature to a known signature by measuring the probabilistic discrepancy or divergence between the spectra. ZMDA normalizes the signatures by their variance and computes their difference, which corresponds to the area between the two vectors. Bhattacharyya distance is similar to Mahalanobois distance but is used to measure the distance between a set of candidate target signatures against a known class of signatures.

After calculating the dissimilarity measure, the processor may compare the value of the dissimilarity measure to a predetermined threshold to determine a match. For one example predetermined threshold, every value of the selected signature must be within 5% of the corresponding value of the signature the pixel of the hyperspectral image. Other thresholds may be used depending upon the implementation.

If the signatures do not match at 220, the processor may iterate to the next pixel in the hyperspectral image via loop logic terminator 226 and iterator 214. If the signatures match at 222, the pixel in the hyperspectral image may be deleted by setting its value to zero at 224 and then the processor may proceed to iterate through the remaining pixels of the hyperspectral image via loop logic terminator 226 and iterator 214. When the processor has iterated through all of the pixels in the hyperspectral image, the process will terminate at 228 at which point the signature-subtracted hyperspectral image may be stored in a database or viewed by a user on a display.

The method 200 may be repeated to remove additional selected signatures for the hyperspectral image. Additionally, the process may be repeated for a series of hyperspectral images. The processor may be configured to perform these steps automatically or manually by displaying intermediate results to a user via a display and receiving instructions via a graphical user interface regarding which substance signatures to subtract. In one implementation of the method, the processor removes all of the signatures representative of the background image leaving only the image correlating to the signatures of the moving or new objects.

Figure 4:
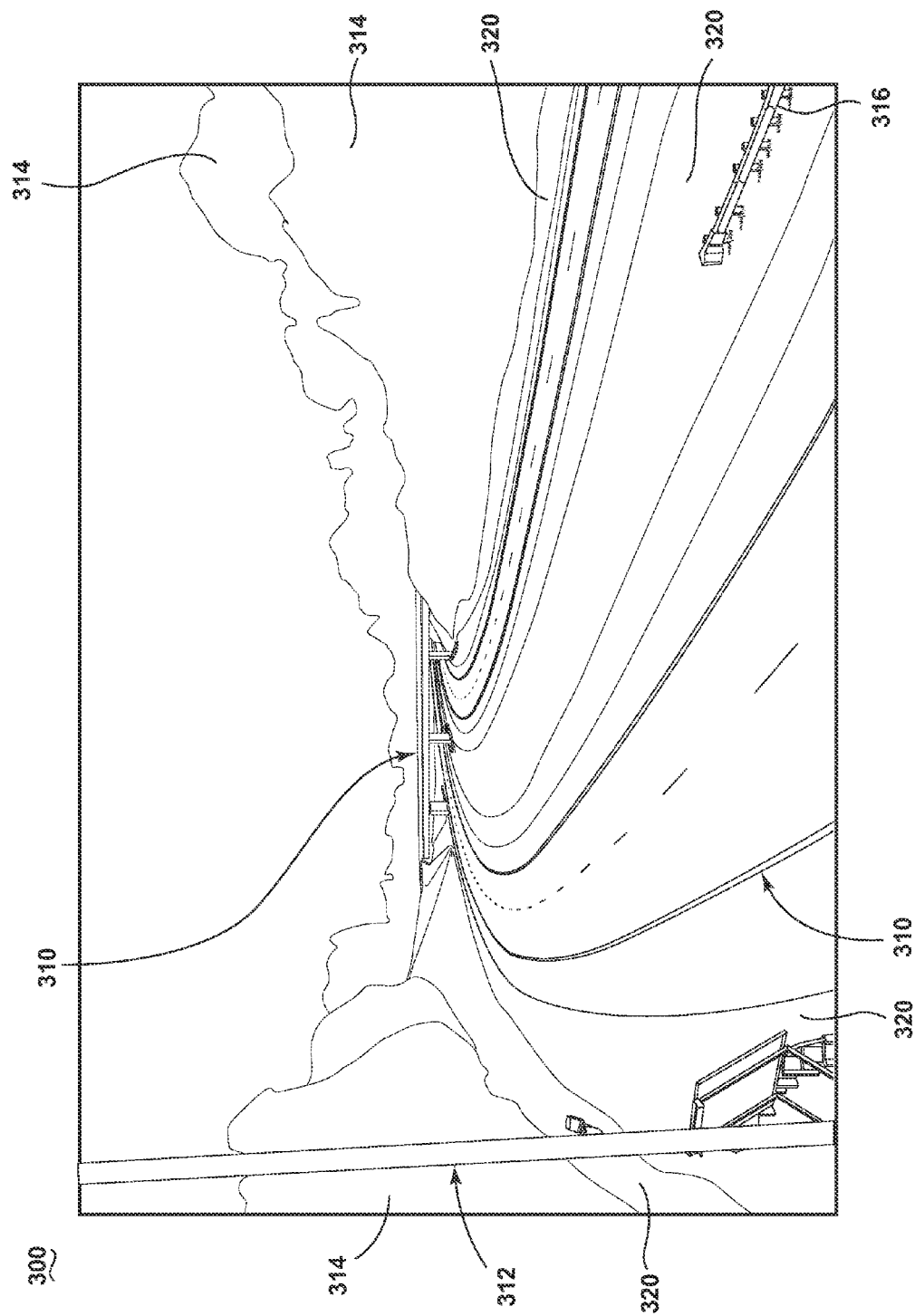
FIG. 4 shows a hyperspectral image of a scene of a highway surrounded by grassy terrain.

By way of example, FIGS. 4-7 demonstrate an embodiment of the present invention. FIG. 4 shows a hyperspectral image of a scene 300 of a highway surrounded by grassy terrain. The image shows a highway 310, a tower 312, trees 314, manmade infrastructure 316, and grassy terrain 320. The processor may identify the hyperspectral image at 18 in FIG. 1 as having no moving objects and store it in the database 46 as a background image of the target scene.

Figure 5:
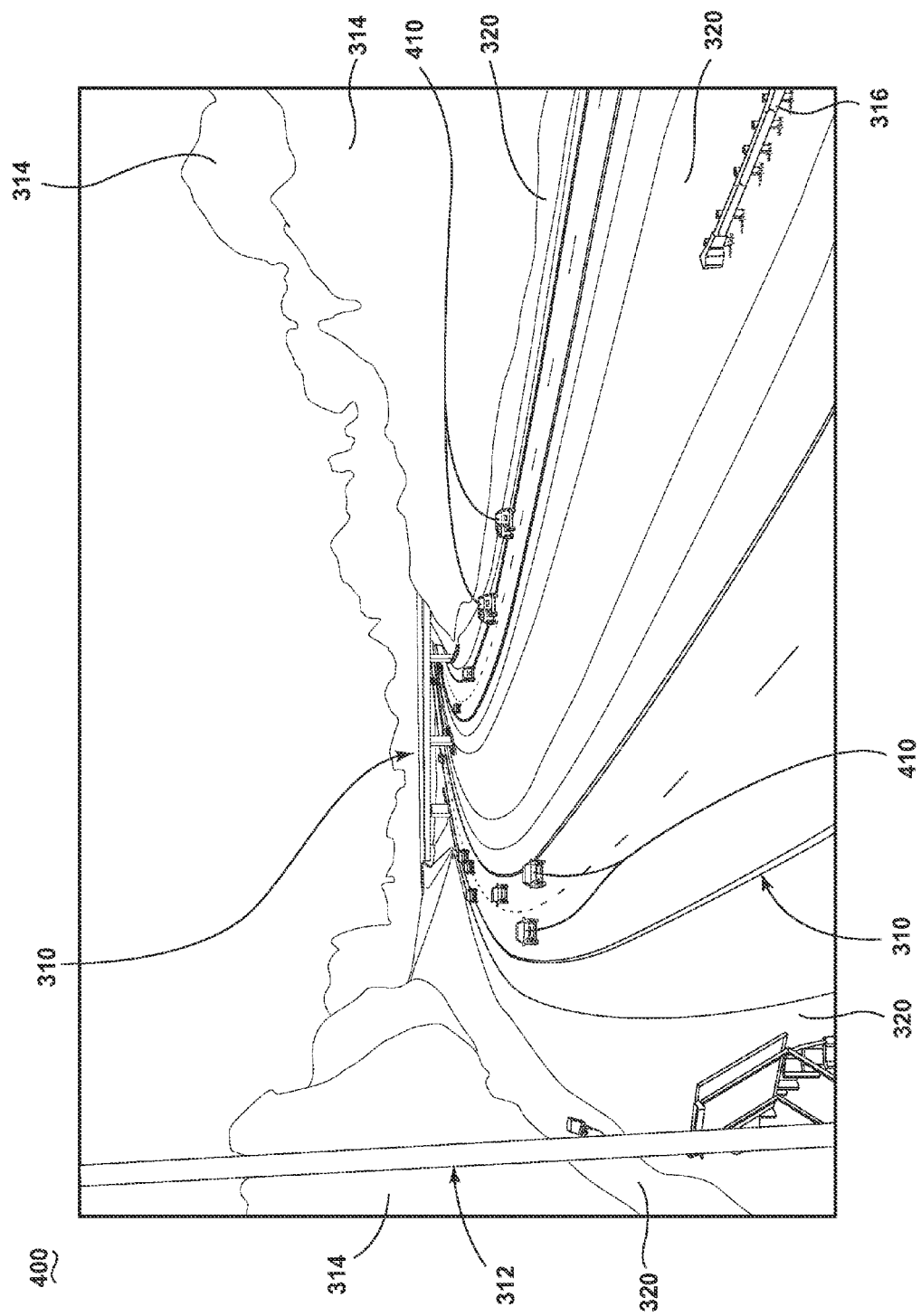
FIG. 5 shows a hyperspectral image of the scene of FIG. 4 where cars are traversing the highway.

FIG. 5 shows a hyperspectral image 400 of the scene of FIG. 4 where cars 410 are traversing the highway 310. The processor may identify this image at 18 as having moving objects. The image 400 of the scene is a candidate for the method of background subtraction 100 of FIG. 2.

Figure 6:
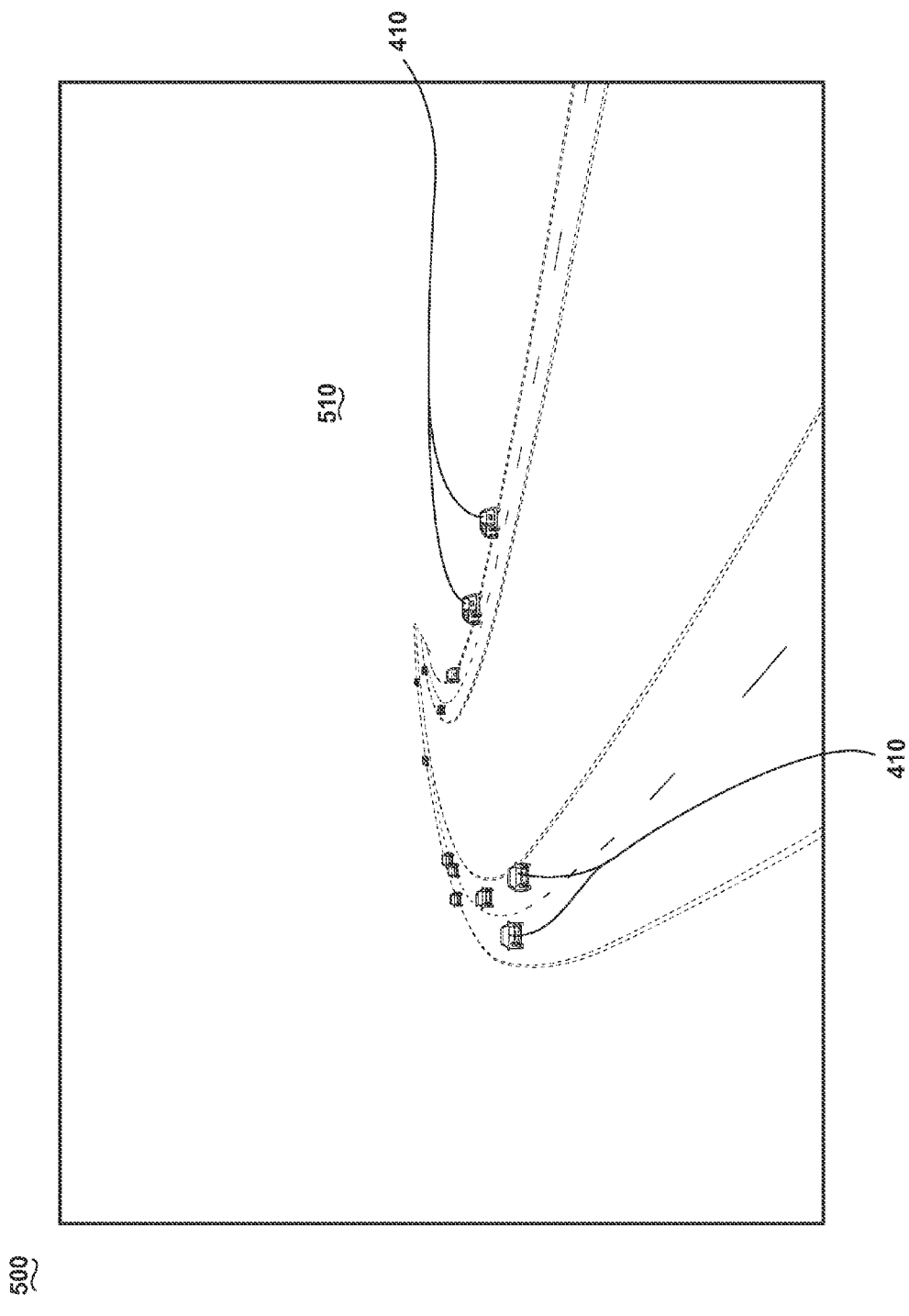
FIG. 6 shows a background-subtracted hyperspectral image of the scene from FIG. 5 where the highway and the grassy terrain has been removed according to an embodiment of the present invention.

FIG. 6 shows a background-subtracted hyperspectral image 500 of the scene from FIG. 5 where the highway and the grassy terrain have been removed according to an embodiment of the present invention. The processor may retrieve the background image 300 from FIG. 4 from the database 46 in FIG. 2. The processor subtracts the background image 300 from FIG. 4 from the hyperspectral image 400 of the scene from FIG. 5. The only remaining elements of the image are the cars 410. All of the non-moving objects from 300 have been deleted, leaving empty space 510. The outline of the highway is shown merely for reference and would not be in the actual image 500.

Figure 7:
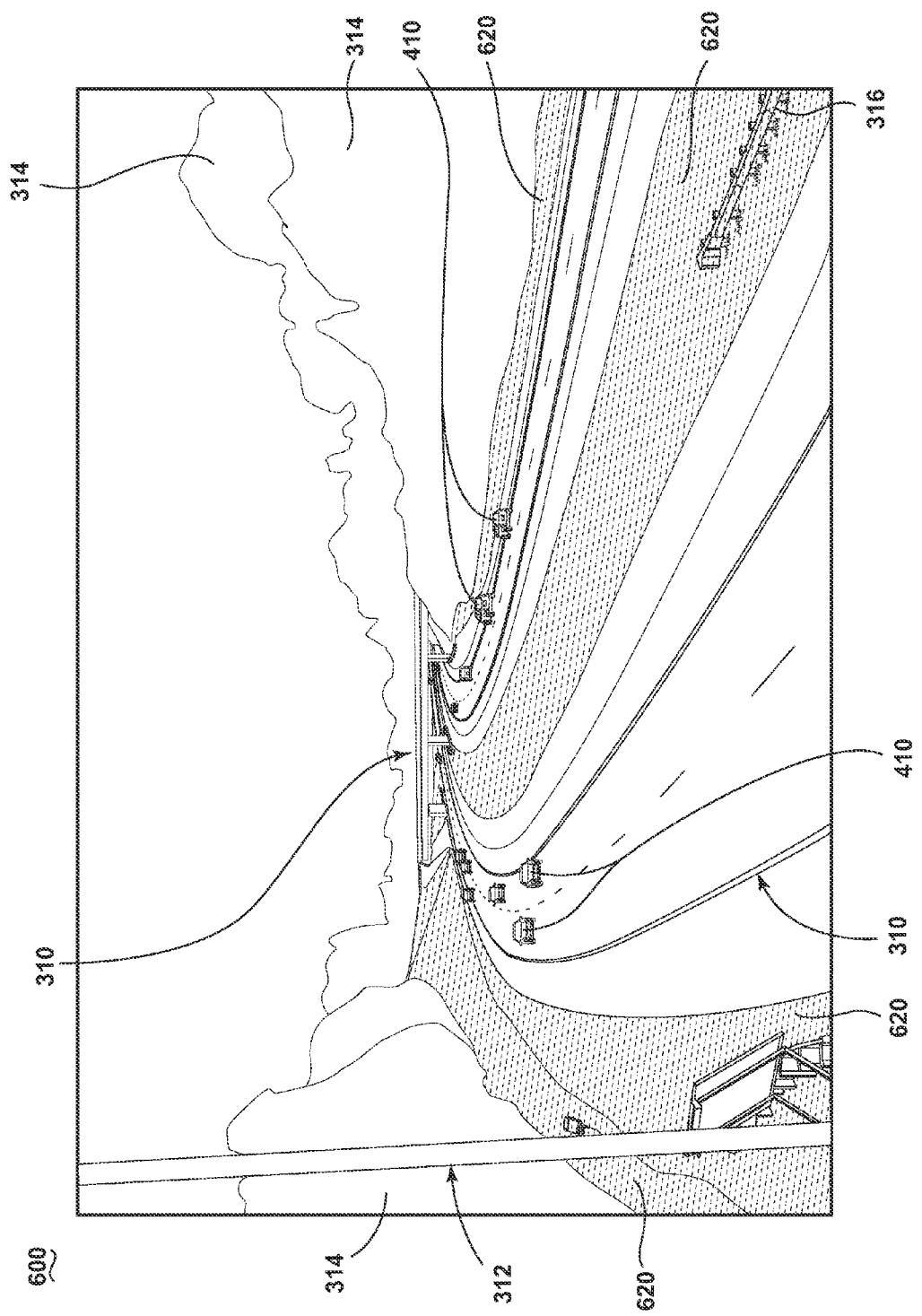
FIG. 7 shows a signature-subtracted hyperspectral image of the scene from FIG. 5 where the grassy terrain has been removed according to an embodiment of the present invention.

FIG. 7 shows a signature-subtracted hyperspectral image 600 of the scene from FIG. 5 where the grassy terrain 320 from FIG. 4 has been removed according to an embodiment of the present invention. The processor removed the signature of the grassy terrain 320 from FIG. 4 using the method of signature subtraction 200 from FIG. 3 to create a large swath of empty space 620 in the resulting signature-subtracted image 600. Other candidate signatures could be identified for removal including the signature of the highway 310, the trees 314 and the manmade infrastructure 316.

The example background-subtracted image 500 of FIG. 6 and the signature-subtracted image 600 of FIG. 7 demonstrate that the methods of the present invention may dramatically improve the detectability of moving objects in hyperspectral imagery. Additionally, the previously described level of data compression is visually apparent, especially in FIG. 6 where only the cars 410 remain.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of removing a hyperspectral signature from at least one hyperspectral image, the method comprising:
    selecting at least one hyperspectral signature;
    determining a dissimilarity value between each pixel in the at least one hyperspectral image and the selected at least one hyperspectral signature;
    if the dissimilarity value between the signature of a given pixel in the at least one hyperspectral image and the selected at least one hyperspectral signature is less than a predetermined threshold value then setting the value of the signature for the given pixel to zero to create a signature-subtracted hyperspectral image; and
    repeating the selecting, determining and setting steps to remove additional hyperspectral signatures.

2. The method of claim 1 where the determining step comprises one of computing the Manhattan distance, the Euclidean distance, the Chebyshev distance, the Mahalanobis distance, Spectral Angle Mapper (SAM), Spectral Information Divergence (SID), Zero Mean Differential Area (ZMDA) and Bhattacharyya distance between each pixel in the at least one hyperspectral image and the selected at least one hyperspectral signature.

3. The method of claim 1 wherein the at least one hyperspectral signature comprises a background image.

4. The method of claim 1 further comprising the step of displaying the signature-subtracted hyperspectral image.

5. The method of claim 1 wherein the step of selecting a hyperspectral signature further comprises selecting the hyperspectral signature from a database of hyperspectral signatures.

6. The method of claim 1 wherein the step of selecting the at least one hyperspectral signature further comprises selecting the at least one hyperspectral signature from hyperspectral signatures contained in the at least one hyperspectral image.

7. The method of claim 1 wherein the selecting step is done manually.

8. The method of claim 1 wherein the selecting step is done automatically.

9. The method of claim 1 further comprising the step of storing the signature-subtracted hyperspectral image.

* * * * *